(12) United States Patent
Kodama et al.

(10) Patent No.: US 7,866,048 B2
(45) Date of Patent: Jan. 11, 2011

(54) POWER HAND TOOL

(75) Inventors: Hisao Kodama, Hiroshima (JP); Syuuji Satou, Hiroshima (JP)

(73) Assignee: Yamabiko Corporation, Tokyo (JP)

( * ) Notice: Subject to any disclaimer, the term of this patent is extended or adjusted under 35 U.S.C. 154(b) by 220 days.

(21) Appl. No.: 11/920,044

(22) PCT Filed: May 16, 2006

(86) PCT No.: PCT/JP2006/310088

§ 371 (c)(1),
(2), (4) Date: Apr. 22, 2008

(87) PCT Pub. No.: WO2006/134749

PCT Pub. Date: Dec. 21, 2006

(65) Prior Publication Data

US 2009/0064504 A1    Mar. 12, 2009

(30) Foreign Application Priority Data

Jun. 13, 2005    (JP)    ............................. 2005-172046

(51) Int. Cl.
*B27B 19/02* (2006.01)
(52) U.S. Cl. ............................. 30/216; 30/210; 30/381; 30/519; 16/110.1; 16/900
(58) Field of Classification Search ................... 30/210, 30/216, 381, 382, 383, 519; 16/110.1, 426, 16/900
See application file for complete search history.

(56) References Cited

U.S. PATENT DOCUMENTS

| 5,065,476 | A | 11/1991 | Dohse et al. |
| 6,108,867 | A | 8/2000 | Nagashima ................. 16/110.1 |
| 7,159,322 | B2 * | 1/2007 | Sasaki et al. .................. 30/216 |
| 7,287,331 | B2 * | 10/2007 | Sasaki et al. .................. 30/519 |

FOREIGN PATENT DOCUMENTS

| EP | 1 535 508 A2 | 6/2005 |
| EP | 1 579 757 A1 | 9/2005 |

OTHER PUBLICATIONS

Communication received from the Canadian Patent Office mailed Oct. 5, 2009 (2 pages).

* cited by examiner

*Primary Examiner*—Hwei-Siu C Payer
(74) *Attorney, Agent, or Firm*—Kratz, Quintos & Hanson, LLP (57) ABSTRACT

A rotatable rear hand grip (3) is releasably locked at a desired rotational position by operation of a control lever member (4). The power hand tool includes: a tool body (1) including an engine for generating driving power used for performing work; a front hand grip (2) fixed to the tool body; a rear hand grip including: a control lever member coupled to the engine for controlling an output of the engine; a supporting mechanism for supporting the rear hand grip rotationally about an axis (AX) between the tool body and the rear hand grip; a locking mechanism for locking the rear hand grip at one rotational position about the axis in response to the control lever member; and a controlling mechanism (4d) for allowing the control lever member to control the output of the engine after the locking mechanism locks the rear hand grip.

9 Claims, 8 Drawing Sheets

POWER HAND TOOL

TECHNICAL FIELD

The present invention relates to a power hand tool with a rotatable rear hand grip such as a hedge trimmer and particularly to a power hand tool with a fixed hand grip and a rear hand grip capable of being rotated to and locked at a desired operation position easy to operate a throttle lever.

BACKGROUND ART

Power hand tools having a tool unit, a tool body including a driving power source, and front and rear hand grips for holding the tool body are known. U.S. Pat. No. 5,065,476 (Patent Document 1) discloses a handheld portable tool including front and rear hand grips for both-hand operation, wherein the rear hand grip including a gas lever is rotatable about a horizontal axis of the tool unit and the tool body. In the power hand tool, the front hand grip is fixed to the tool body including the driving power source. The rear hand grip is rotatably supported by a supporting member provided at the tool body. A lock mechanism for automatically locking the rear hand grip at a predetermined operating position is provided at the supporting member and/or the rear hand grip.

The locking mechanism is unlocked only when the power hand tool is in a stop status or only when the tool unit is not driven, because a safety mechanism is provided for allowing the gas lever to be operated only when the lock mechanism is in a locked status.

Accordingly, the gas lever has an arc member at an end of its extended part. A moving locus of the arc member while the gas lever is rotated is overlapped with an upper limit surface of a detent pawl (a detent wedge). This prevents the gas lever and the lock lever from being operated at the same time.

The detent pawl (the detent wedge) is separately operated from the gas lever. Thus, there is a problem in that it is difficult to operate the detent pawl or the detent wedge and the gas lever by a single action. Further, the part of the detent pawl outside a frame may be actuated or damaged by a touched twig of a tree.

Accordingly, the present invention is developed to solve the problem by such operation that: actuating a control lever for controlling a drive power source in a tool body locks a rear hand grip to inhibit rotation of the rear hand grip; and releasing the control lever unlocks a rear hand grip to allow the rotation of the rear hand grip.

DISCLOSURE OF THE INVENTION

An aspect of the present invention provides a tool body including: a driving power source for generating a driving power used for performing predetermined work; a front hand grip fixed to the tool body; a rear hand grip including: a control lever member coupled to the driving power source for controlling an output of the driving power source; supporting means for rotationally supporting the rear hand grip with respect to the tool body; locking means provided at the rear hand grip and the tool body for locking the rear hand grip at one of predetermined rotational positions relative to the tool body; and controlling means for allowing the control lever member to control the output of the driving power source when the locking means locks the rear hand grip.

Preferably, the locking means is actuated by the control lever member to lock the rear hand grip relatively to the tool body.

Preferably, the controlling means comprises an elongated hole at the control lever member and an anti-plucking member, coupled to the driving power source with a wire, slidably fitted in the elongated hole so as to allow the control lever member to control the output of the driving power source when the locking means locks the rear hand grip relatively to the tool body.

Preferably, the supporting means comprises a shaft; and the locking means comprises: a plurality of notches in an end of the shaft spaced at a predetermined angular interval for defining a plurality of the rotational positions; and a lock arm responsive to the control lever member and movable from the control lever member for, at one end thereof, releasably fitting in one of the notches.

Preferably, a protrusive lever is provided the control lever member; the lock arm has a space therein for housing the protrusive control lever; and the end of the lock arm is releasably fitted in one of the notches when pushed by one end of the protrusive lever actuated by the control lever member when the end of the lock arm faces one of the notches.

Preferably, the power hand tool further comprises a lock lever fitted in another one of the notches to lock the tool body at one of the rotational positions.

Preferably, the supporting means supports the rear hand grip rotationally about an axis between the tool body and the rear hand grip, and the lock arm fits in the one of the notches toward the axis as well as the lock lever fits in another one of the notches toward the axis.

Preferably, the control lever member comprises a lever part; the locking means comprises at the rear hand grip a release lever for releasing the tool body from one of predetermined rotational positions; and the lever part comprises a protrusive part extending from the control lever toward the release lever for inhibiting an operator from entering a space between the protrusive part and the release lever while the operator actuates the control lever.

BEST MODE FOR CARRYING OUT THE INVENTION

Figures 1, 2, 3:
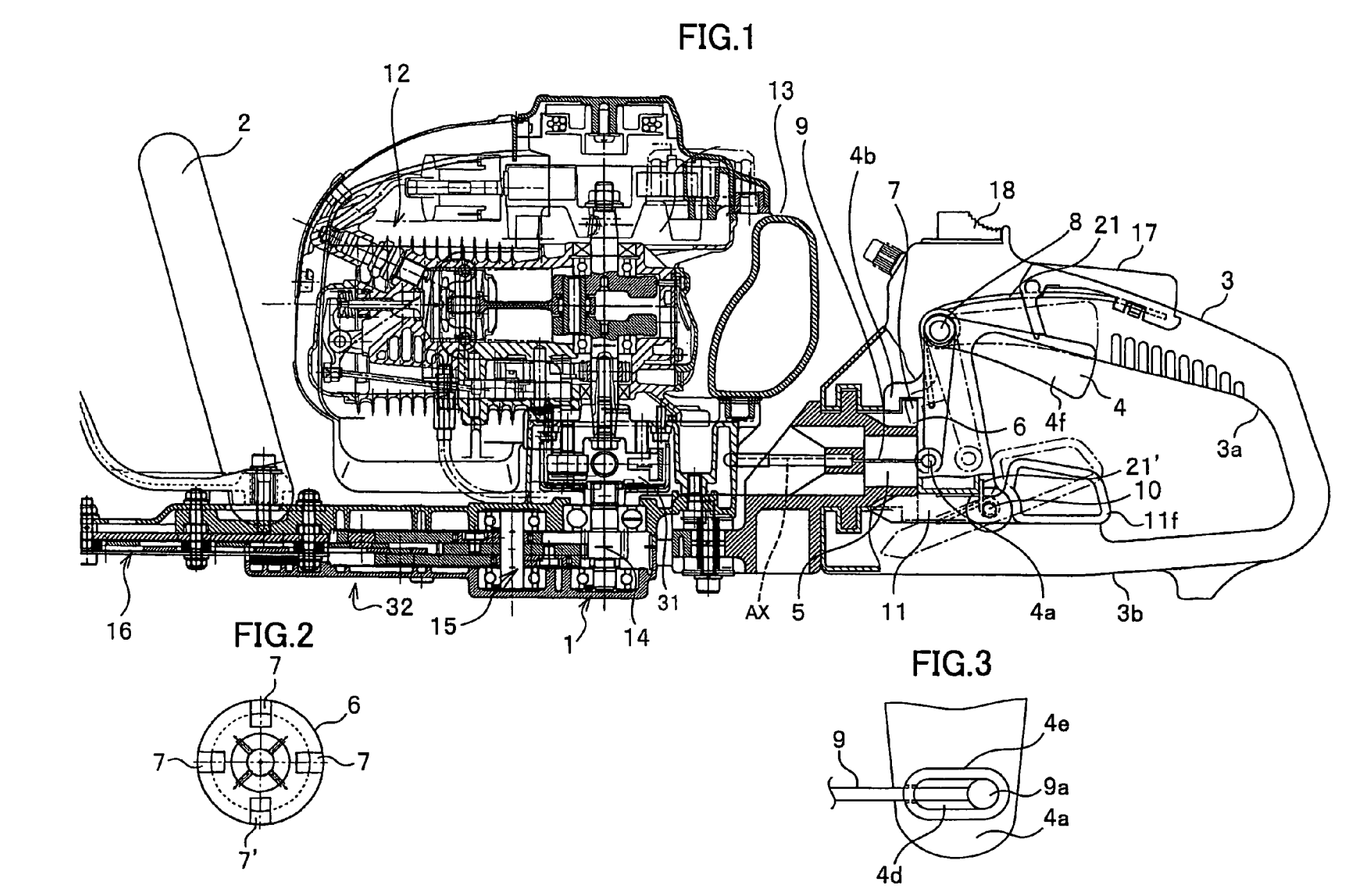
FIG. 1 is a partial cross-sectional view of an embodiment of a power tool according to the present invention.
FIG. 2 is an end view of a supporting part for a hand grip in the power tool according to the present invention.
FIG. 3 is a partial view of an end of a throttle lever in the power tool according to the present invention.
Figure 4:
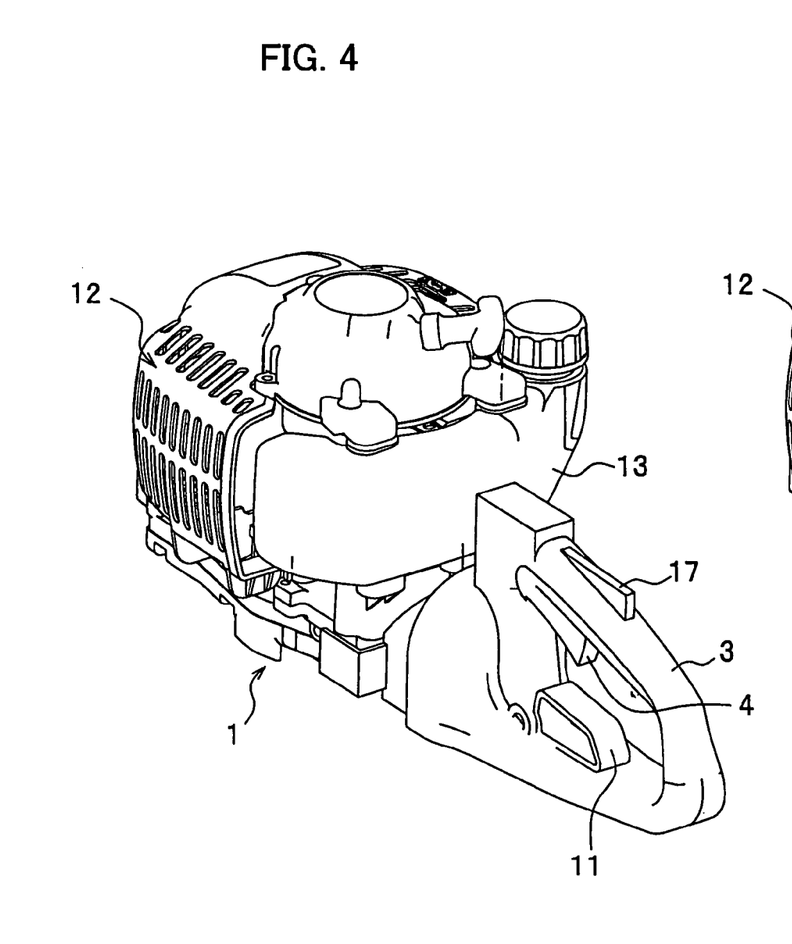
FIGS. 4 and 5 are perspective views of the power hand tool, in vertical and lateral positions, respectively, according to the present invention.
Figure 5:
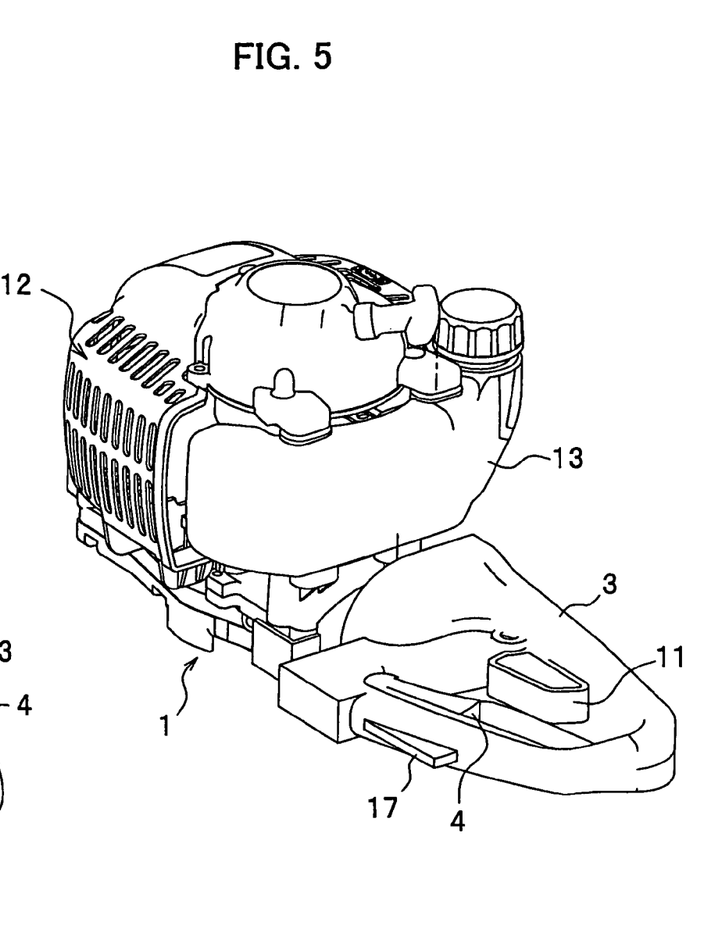

Hereinafter will be described in details a first embodiment of a power hand tool according to the present invention with reference to drawings. FIG. 1 shows a hedge trimmer as a power hand tool including a tool body 1, a rear hand grip 3, and a supporting part 5, and FIG. 2 shows an end of the supporting part 5 for the rear hand grip 3. FIG. 3 shows a partial view of one end 4a of the throttle lever 4. FIG. 4 shows a perspective view of the power hand tool in which the rear hand grip 3 is rotated to bring the throttle lever 4 at an upright position. FIG. 5 shows a perspective view of the power hand tool in which the rear hand grip 3 is rotated to bring the throttle lever 4 at a lateral position. In this specification, a front is defined as a side of a trimming blade 16 attached to the tool body 1, and a rear is defined as a side of the rear hand grip 3.

In the first embodiment of the present invention, a front hand grip 2 is fixed to the tool body 1 including an engine (a driving power source) 12 for the trimming blade 16. The trimming blade 16 is attached to the tool body 1 with an attachment 32. The rear hand grip 3 is provided behind the engine 12 in which the rear hand grip 3 including the throttle lever 4 for adjusting the throttle valve of the engine 12 is fixed to the supporting part 5 such that the rear hand grip 3 is rotatable and can be locked.

The supporting part 5 includes a shaft and a brim 6 formed at a rear end of the shaft in which notches 7 are formed at a predetermined angular interval. A throttle wire 9 is connected to one end 4a of the throttle lever 4. The throttle lever 4 is formed to have the other end 4b which is fitted in the notch 7 by actuating the throttle lever 4 when the other end 4b faces the notch 7. This allows operation of the throttle lever 4 to control the engine 12 and inhibits rotation of the rear hand grip 3.

In addition the shaft has an annular protrusion which restricts movement of the shaft in the axial direction together with the rib 6.

Regarding the operation of the throttle lever 4, it is most preferable from a safety point view to pull the throttle wire 9 after the rear hand grip 3 is locked so as not to be rotated. This configuration is provided as follows:

As shown in FIG. 3, an elongated hole 4d is formed at one end 4a of the throttle lever 4. An anti-plucking member 9a connected to an end of the throttle wire 9 is inserted in the elongated hole 4d such that it can be slide and cannot be pulled out.

This configuration makes the throttle lever 4 operable when the other end 4b of the throttle lever 4 faces the notch 7 formed in the brim 6. When the throttle lever 4 is pulled, the other end 4b is surely fitted in the notch 7 in which play caused by slide of the anti-plucking member 9a in the elongated hole 4d is absorbed and then, the throttle wire 9 is pulled, so that an engine speed of the engine 12 increases. Around the elongated hole 4d is formed a rib 4e.

Further the rear hand grip 3 is configured to have a lock lever 11 which is fitted in an opposite notch 7' formed in the brim 6 when the throttle lever 4 becomes operable after the other end 4b of the throttle lever 4 fits in the notch 7 formed in the brim 6.

The lock lever 11 is configured to release a locking status in response to pull of a pull arm 11f after a part of fingers on the rear hand grip 3 is extended without release of a hand from the rear hand grip 3. This provides a superior operability. Further, the lock lever 11 is configured to make it difficult that the lock lever 11 hooks plants and twigs because the lock lever 11 is housed inside a frame 3a of the rear hand grip 3. Further, this operability is unchanged in accordance with the dominant hand of the operator.

In the power hand tool configured as mentioned above, operating the throttle lever 4 when the other end 4b of the throttle lever 4 provided at the rear hand grip 3 faces the notch 7 formed in the brim 6 of the rear end of the supporting part 5 causes the other end 4b to fit in the notch 7, and thus the throttle valve can be operated, and the rear hand grip 3 cannot be rotated. More specifically, operation of the throttle lever 4 is controlled with the play of the anti-plucking member 9a in the elongated hole 4d so as to operate the throttle valve after the other end 4b of the throttle lever 4 enters in one of the notches 7.

Further, when operation of the throttle lever 4 is allowed, the lock lever 11 provided at a rim 3a of the rear hand grip 3 fits in an opposite notch 7' formed in the brim 6, holding the rear hand grip 3 without rotation thereof as well as inhibiting the rotation even when the throttle lever 4 is not operated.

In addition, as shown in FIG. 1, on the tool body 1 are provided the engine 12 and a fuel tank 13, in which an output shaft 14 of the engine 12 is coupled to the trimming blade 16 through a motion converting mechanism 15 for converting a rotational motion into a reciprocating motion. Further, a clutch 31 is provided for an idling operation between the engine 12 and the output shaft 14.

On the rear hand grip 3 is provided a lock member 17 for unlocking the throttle lever 4 to allow the throttle lever 4 to be operated by pushing the lock member 17. Further on the rear hand grip 3 is provided a switch 18 for stopping the engine 12.

The throttle lever 4 is rotatably supported by the rear hand grip 3 about a supporting shaft 8, and the lock lever 11 is rotatably supported by the rear hand grip 3 about a supporting shaft 10.

In addition, a coil spring 21 is loaded about the supporting shaft 8 for actuating the throttle lever 4 to be returned (opposite to actuating). About the supporting shaft 10 is provided a spring 21' for actuating the lock lever 11 to effect locking operation of the lock lever 11. To perform lock release operation for the lock lever 11, the pull arm 11f of the lock lever 11 is caught with the finger and rotated against loading force by the spring 21'.

In a case that the above-mentioned power hand tool is configured as the hedge trimmer, if a top of a hedge is horizontally cut, the rear hand grip 3 can be rotated such that the throttle lever 4 is, as shown in FIG. 4, made at the upright position to facilitate the operation of the power hand tool. When a side of the hedge is vertically cut, the rear hand grip 3 is rotated so as to make the throttle lever 4, as shown in FIG. 5, at the lateral position to perform the operation.

In the above-mentioned embodiment, the rear hand grip 3 includes the frame 3a having an inside space therein. The throttle lever 4 includes a lever part 4f at the inside space. The lock lever 11 extends to the inside space. The throttle lever 4 and the lock lever 11 are arranged at such a distance therebetween as to be accessible by a same finger without releasing the rear hand grip 3 by a hand of the finger when the rock lever 11 is accessed for releasing. The lever part 4f rotates in response to the control operation in a first rotational direction about the supporting shaft 8, and the lock lever 11 rotates in response to the releasing operation about the supporting shaft 10 in a second rotational direction which is the same as the first rotational direction. The lock lever 11 is pulled in an inward direction of the frame 3a.

Figure 6:
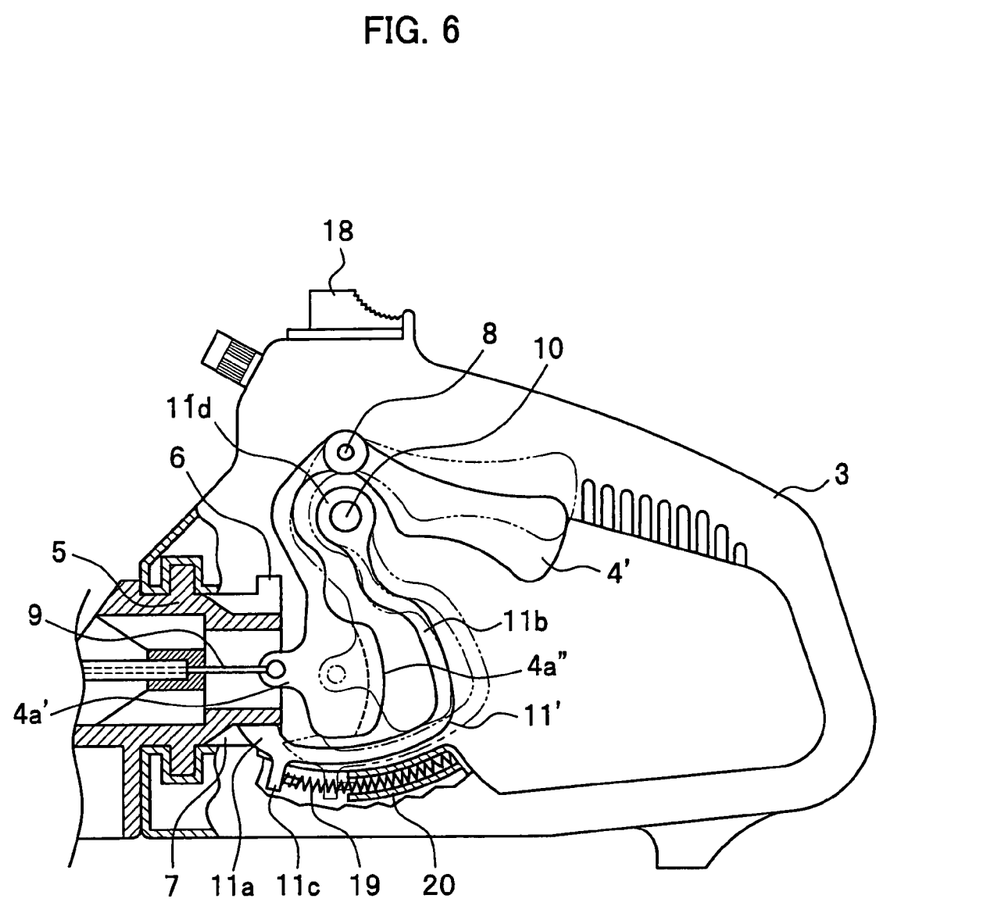
FIG. 6 is a partial view showing a rear hand grip according to a second embodiment.

Hereinafter will be described a second embodiment with reference to FIG. 6. FIG. 6 shows the second embodiment of the power hand tool according to the present invention and particularly shows the supporting part 5 for the rear hand grip 3.

The second embodiment is different from the first embodiment in that: a lock lever 11' is provided at the rear hand grip 3 for locking the rear hand grip 3, an end 11a of the lock lever 11' fitting in the opposite notch 7' in the brim 6 when the rear hand grip 3 is rotated to a desired rotational position; and a throttle lever 4' covers, when the throttle lever 4' is operated, a pull arm 11b of the lock lever 11' to prevent the finger from catching the pull arm 11b to inhibit releasing operation.

The lock lever 11' has a fishing hook form of which proximal part 11d is rotatably supported by the rear hand grip 3 about the supporting shaft 10. At the end 11a is formed an engagement stopper 11c for allowing a spring 19 to actuate the end 11a to be fitted in the notch 7. The spring 19 is guided by a spring guide 20.

The rear hand grip 3 rotationally supports, about the supporting shaft 8, in front of the lock lever 11', a throttle lever 4' with one end 4a' which has a fitting groove formed on a rear face 4a" of one end 4a' of the throttle lever 4' facing the pull arm 11b of the lock lever 11'. When the throttle lever 4' is operated (pulled), one end 4a' moves to a position where the fitting groove becomes in contact with the pull arm 11b to be covered with the rear face 4a".

As configured above, when the throttle lever 4' is operated, the rear face 4a" covers the pull arm 11b, which inhibits the operator from touching the pull arm 11b with the finger, thus eliminating a possibility of erroneous release of the lock lever 11' during operation of the throttle lever 4'.

Figure 7:
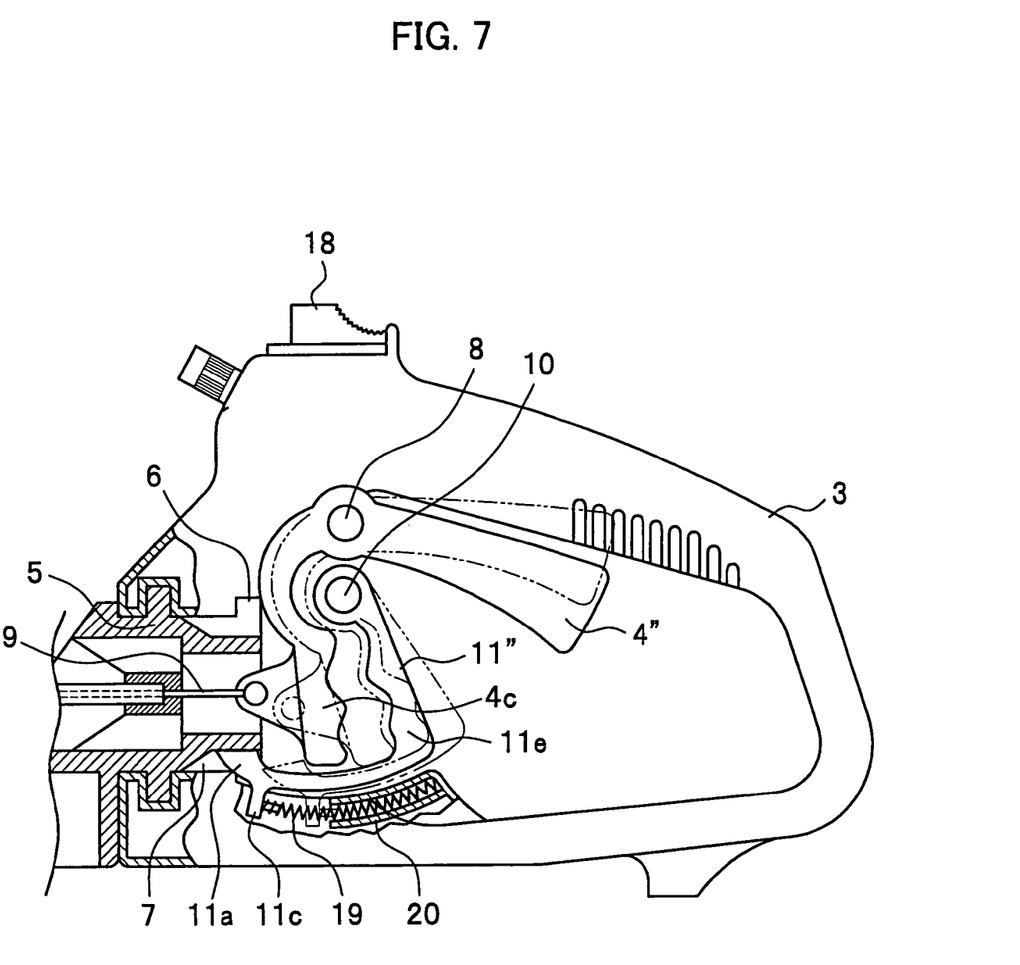
FIG. 7 is a partial view of a rear hand grip according to a third embodiment.
Figure 8:
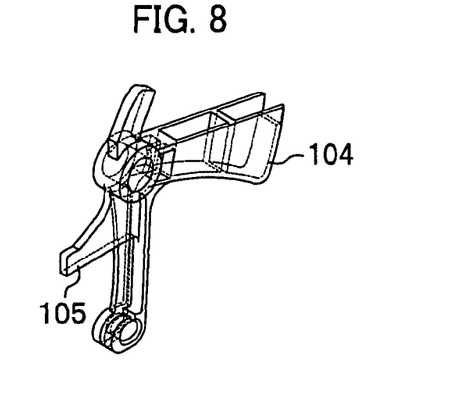
FIG. 8 is a perspective view of a trigger according to a fourth embodiment.

A third embodiment will be described in details with reference to FIG. 7. FIG. 7 shows the third embodiment of a power hand tool according to the present invention and particularly shows the supporting part for the rear hand grip 3. The third embodiment is different from the second embodiment shown in FIG. 6 in that the lock lever 11" has an inverted L shape. The rear hand grip 3 rotationally supports the lock lever 11" at its upper end (in FIG. 7) about the supporting shaft 10. The throttle lever 4" is formed in an L shape, a front part of a horizontal part 4c of the L shape being connected to the throttle wire 9, the horizontal part 4c of the L shape faces a vertical part (trigger) 11e of the inverted L shape, and the throttle lever 4" is rotationally supported at its corner by the rear hand grip 3 about the supporting shaft 8.

As configured above, when the throttle lever 4" is operated, the horizontal part 4c of the L shape becomes in contact with the vertical part 11e of the inverted L shape, which inhibits the operator from touching the vertical part 11e, thus eliminating a possibility of erroneous release of the lock lever 11" during operation of the throttle lever 4".

In the second and third embodiments, the lock levers 11' and 11" for locking by actuating them by the spring 19 are mere embodiments. For example, locking may be provided by actuating the lock levers 11' and 11" with helical torsion springs (not shown) at the supporting shaft 10.

According to the present invention with reference to FIGS. 8 to 15 will be described a fourth embodiment of a power hand tool. The power hand tool of the fourth embodiment has substantially the same configuration as that of the first embodiment. The difference is in that the throttle lever 4 in the first embodiment is replaced with a throttle lever 104 and a lock arm 106.

Figure 9:
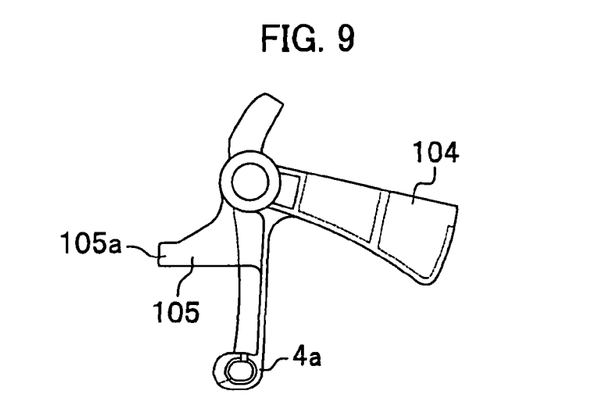
FIG. 9 is a side view of the trigger according to the fourth embodiment.
Figure 10:
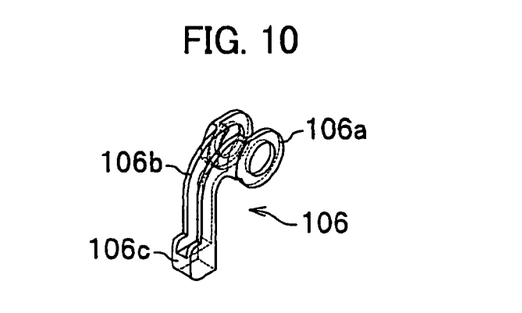
FIG. 10 is a perspective view of a lock arm according to the fourth embodiment.
Figure 11:
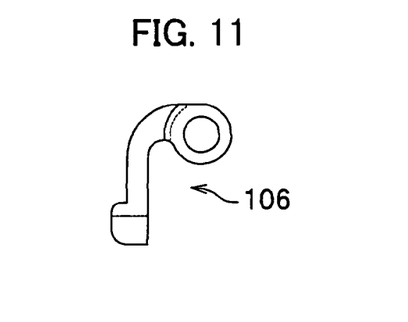
FIG. 11 is a side view of the lock arm according to the fourth embodiment.
Figure 12:
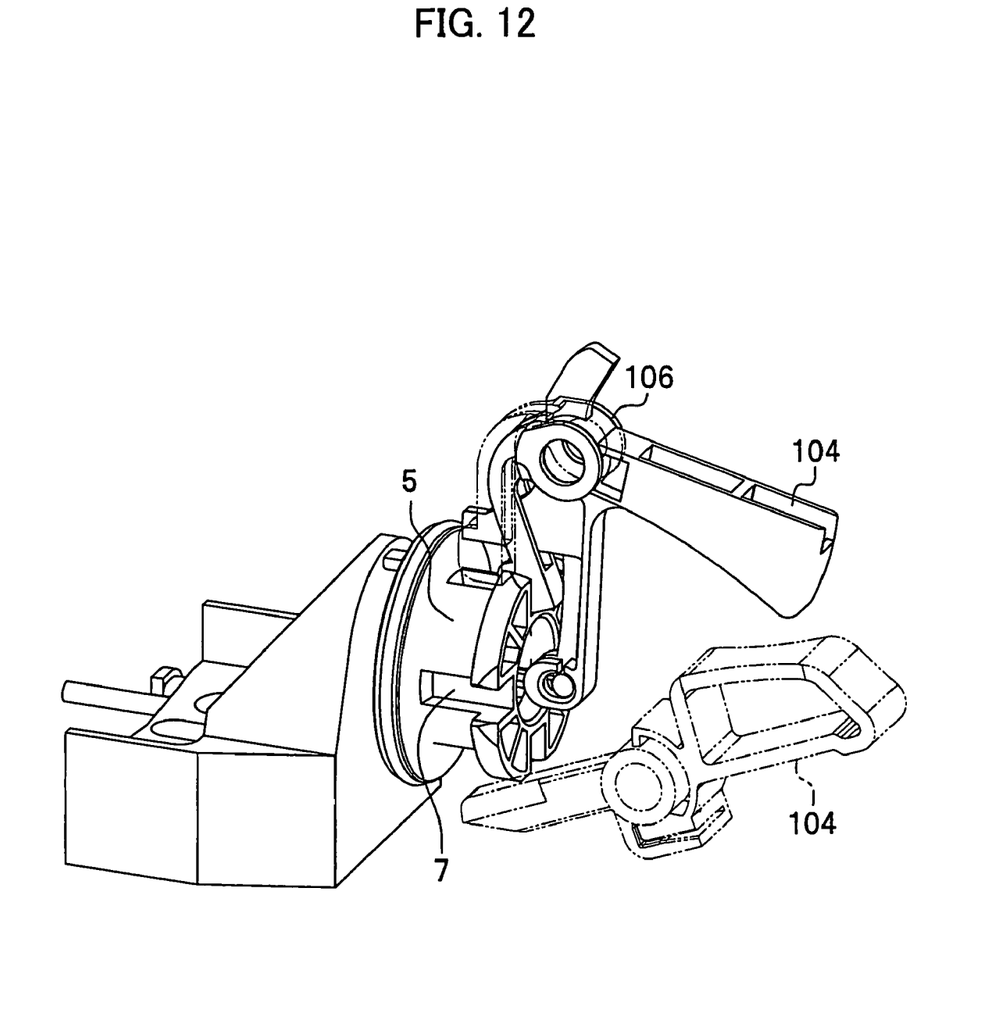
FIG. 12 is a perspective view of a supporting part according to the fourth embodiment.

FIGS. 9 and 10 show the throttle 104 and the lock arm 106, respectively. The throttle lever 104 has substantially the same configuration as the throttle lever 4 in the first embodiment. The difference is in that the other end 4b is replaced with a protrusive lever 105. The throttle lever 104 has an extension part extending from the shaft 8 downwardly (in FIG. 9) to the end 4a and the protrusive lever 105 horizontally extending from the extension part along the rotation axis AX of the rear hand grip 3 toward the tool body 1.

On the same supporting shaft 8 is arranged the lock arm 106 first extending toward the rotation axis AX and then downwardly curved to approach near the notches 7.

The lock arm 106 includes two ring plates 106a on the supporting shaft 8 for the throttle lever 104, two parallel plates 106b extending from the ring plates 106a along the rotation axis AX and then curved downwardly in FIG. 10, and a bottom plate 106c connecting lower ends of the parallel plates 106b. The ring plates 106a sandwich the throttle lever 104 on the supporting shaft 8. The protrusive lever 105 can enter a space between the parallel plates 106b untouchably or slidably. The bottom plate 106c receives an end of the protrusive lever 105 to be actuated downward in FIG. 13.

Figure 13:
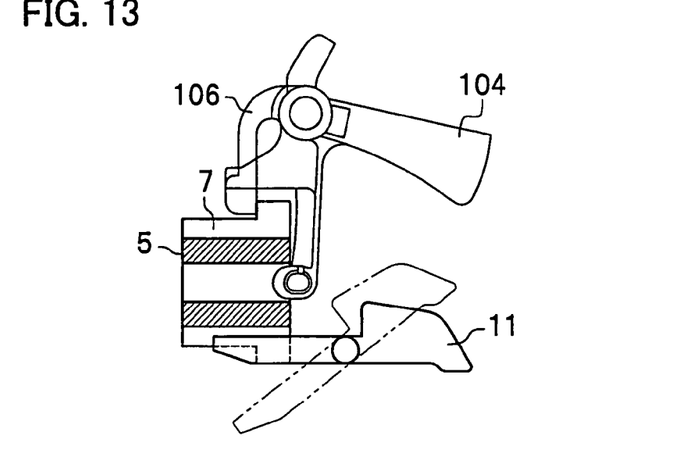
FIGS. 13 to 15 show locking and releasing operation according to the fourth embodiment.
Figure 14:
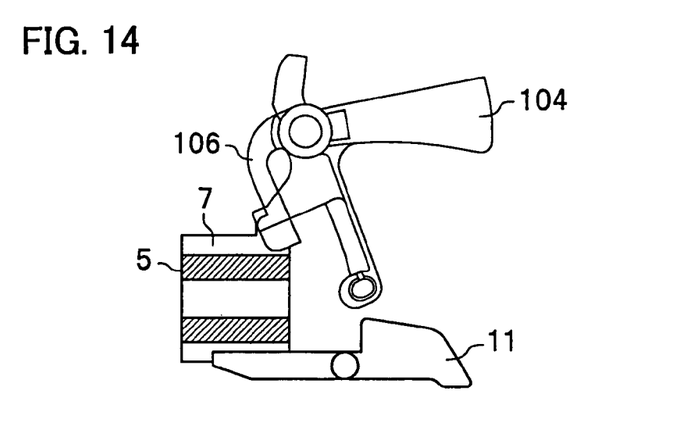

An end of the lock arm 106 including the bottom plate 106c is downwardly actuated by the throttle lever 104 with the protrusive lever 105 to be releasably fitted in one of the notches 7 as shown in FIG. 14. When the operator releases the throttle lever 104, the lock arm 105 returns, as shown in FIG. 13, to a rest (original) position because it is spring-loaded.

FIGS. 13 to 17 show operation of the lock arm 106. FIG. 13 shows a stop status and an idling status of the tool body 1. In this status, the throttle lever 104 and the lock arm 106 are positioned at the rest positions, and only the lock lever 11 (indicated with a solid line) fits into the opposite notch 7' to lock the rear hand grip 3, i.e., inhibits the operator from rotating the rear hand grip 3. If the operator operates the lock lever 11 (indicated with a two-dot chain line), i.e., pulls the lock lever 11 with a finger, the rear hand grip 3 can be rotated.

Figure 15:
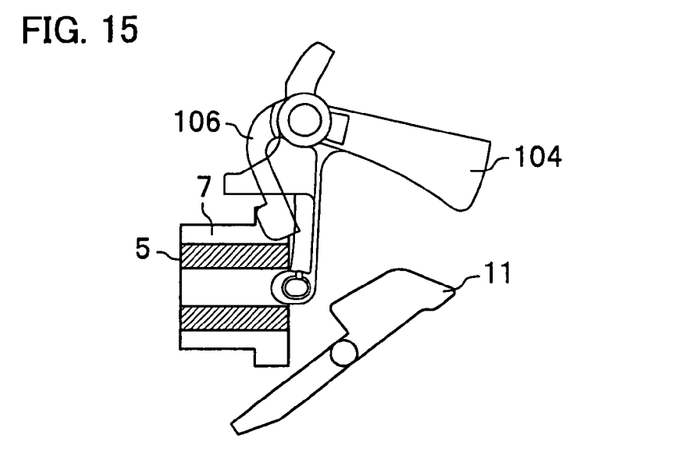

In this status shown in FIG. 13, if the operator actuates the throttle lever 104 by pulling the throttle lever 104 with the finger, one end 4a of the throttle lever 104 pulls the throttle wire 9, as well as the end of the protrusive lever 105 pushes the end of the lock arm 106 downwardly in FIG. 14 to be fitted in one of the notches 7. This locks the rear hand grip 3 in addition to the lock lever 11. Thus, if the lock lever 11 is forcibly operated with another finger and the like as shown in FIG. 15, the end of the lock arm 106 remains in one of the notches 7, locking the rear hand grip 3. When the operator releases the throttle lever 104, the throttle lever 104 and the lock arm 106 return to the original positions, respectively, as shown in FIG. 13.

Figure 16:
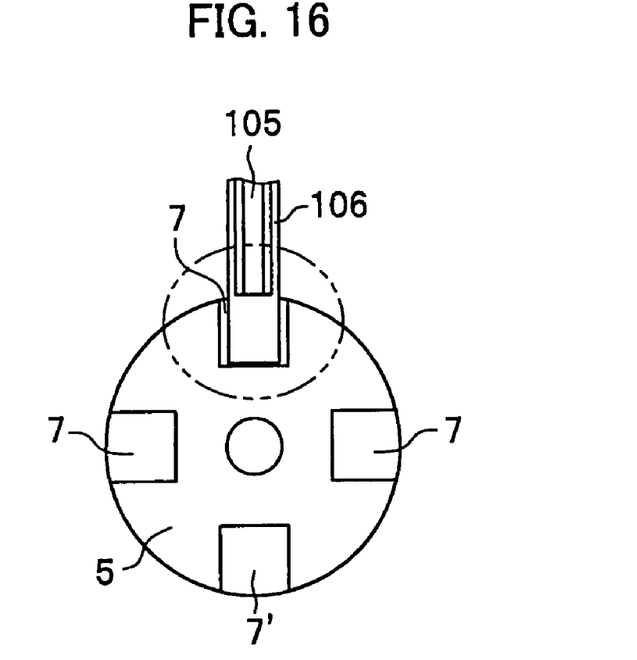
FIG. 16 is the end view of the supporting part for the rear hand grip when the rock arm is actuated according to the fourth embodiment.

FIG. 16 shows a status in which the end of the protrusive lever 105 pushes the bottom plate 106c of the lock arm 106, and the end of the lock arm 106 enters another one of the notches 7. The end of the protrusive lever 105 enters a space between the parallel plates 106b with gaps, so that the end of the protrusive lever 105 can be released from the space when the throttle lever 104 is released.

Figure 17:
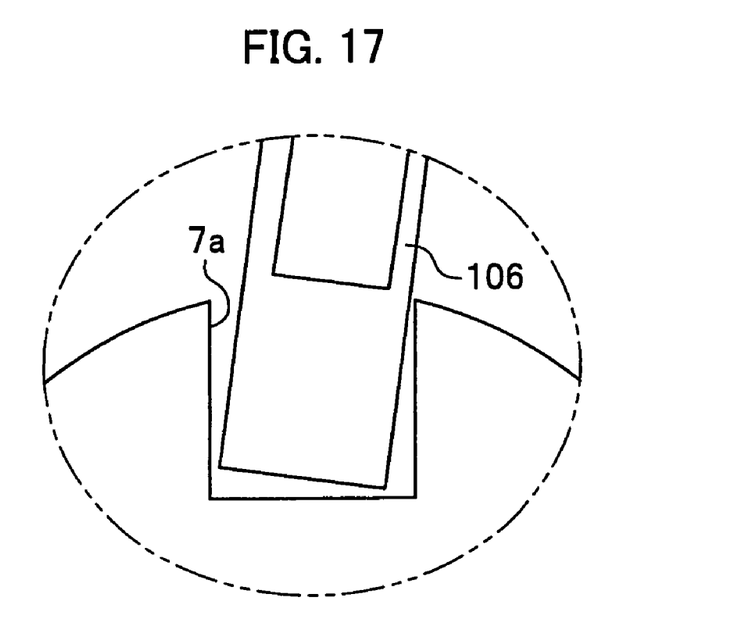
FIG. 17 is an enlarged view of a part circled by a broken line in FIG. 16 to show locking operation.

However, when the operator tries to forcibly operate the lock lever 11 with another finger and the like as shown in FIG. 15 and rotate the rear hand grip 3 in the status shown in FIG. 16, the end of the lock arm 106 remains in one of the notches 7, which locks the rear hand grip 3. Then if the operator releases the throttle lever 104, only the throttle lever 104 returns to the original position, and the engine 12 goes in the idling status. More specifically the end of the lock arm 106 is caught by walls 7a of one of the notches 7 as shown in FIG. 17, which locks the rear hand grip 3 to inhibit the operator from rotating the rear hand grip 3.

Even in this status, the end of the lock arm 106 can be released from the space between the parallel plates 106b because the gaps are left between the end of the protrusive lever 105 and the parallel plates 106, respectively.

In this status (FIG. 17), if the operator tries to rotate the rear hand grip 3 in the opposite rotational direction, the caught end of the lock arm 106 is released because its bent end is returned, so that the end of the lock arm 106 also returns to the rest position.

The fourth embodiment can be combined with the first embodiment because the power hand tool of the fourth embodiment has substantially the same configuration as that of the first embodiment, wherein the difference is in that the throttle lever 4 of the first embodiment is replaced with the throttle lever 104 and the lock arm 106, wherein the end of the lock arm 106 is fitted in the notch 7 similar to the first embodiment.

In the above-mentioned embodiments, the trimming blade 16 is detachably attached with the attachment 32 to the tool body 1. However, the trimming blade 16 can be directly connected to the tool body 1 without the attachment 32. 7.

In the fourth embodiment, each of the notches 7 is commonly used between the lock arm 106 and the lock lever 11 in two of the rotational positions because each of the notches 7 is located at a same radial distance from the axis AX.

INDUSTRIAL APPLICABILITY

The present invention is applicable to power hand tools for performing a predetermined function with the front hand grip and the rotatable rear hand grip.

The invention claimed is:

1. A power hand tool comprising a tool body including: a driving power source for generating a driving power used for performing predetermined work;
a front hand grip fixed to the tool body;
a rear hand grip including: a control lever member coupled to the driving power source for controlling an output of the driving power source;
supporting means for rotationally supporting the rear hand grip with respect to the tool body;
locking means provided at the rear hand grip and the tool body for locking the rear hand grip at one of predetermined rotational positions relative to the tool body; and
controlling means for allowing the control lever member to control the output of the driving power source when the locking means locks the rear hand grip, wherein
the locking means is actuated by the control lever member to lock the rear hand grip relatively to the tool body, and wherein
the controlling means comprises an elongated hole at the control lever member and an anti-plucking member, coupled to the driving power source with a wire, slidably fitted in the elongated hole so as to allow the control lever member to control the output of the driving power source when the locking means locks the rear hand grip relatively to the tool body.

2. A power hand tool comprising a tool body including: a driving power source for generating a driving power used for performing predetermined work;
a front hand grip fixed to the tool body;
a rear hand grip including: a control lever member coupled to the driving power source for controlling an output of the driving power source;
supporting means for rotationally supporting the rear hand grip with respect to the tool body;
locking means provided at the rear hand grip and the tool body for locking the rear hand grip at one of predetermined rotational positions relative to the tool body; and
controlling means for allowing the control lever member to control the output of the driving power source when the locking means locks the rear hand grip, wherein
the locking means is actuated by the control lever member to lock the rear hand grip relatively to the tool body, and wherein
the supporting means comprises a shaft; and
the locking means comprises: a plurality of notches in an end of the shaft spaced at a predetermined angular interval for defining a plurality of the rotational positions; and
a lock arm responsive to the control lever member and movable from the control lever member for, at one end thereof, releasably fitting in one of the notches.

3. The power hand tool as claimed in claim 2, wherein:
a protrusive lever is provided to the control lever member;
the lock arm has a space therein for housing the protrusive lever; and
the end of the lock arm is releasably fitted in one of the notches when pushed by one end of the protrusive lever actuated by the control lever member when the end of the lock arm faces one of the notches.

4. The power hand tool as claimed in claim 2, further comprising a lock lever fitted in another one of the notches to lock the tool body at one of the rotational positions.

5. The power hand tool as claimed in claim 4, wherein the supporting means supports the rear hand grip rotationally about an axis between the tool body and the rear hand grip, and the lock arm fits in the one of the notches toward the axis as well as the lock lever fits in another one of the notches toward the axis.

6. A power hand tool comprising:
a tool body including a driving power source for generating a driving power used for performing predetermined work:
a front hand grip fixed to the tool body;
a rear hand grip including a control lever member coupled to the driving power source for controlling an output of the driving power source;
supporting means for rotationally supporting the rear hand grip with respect to the tool body;
locking means comprising first and second parts provided at the rear hand grip and the tool body for locking the rear hand grip at one of predetermined rotational positions relative to the tool body;
controlling means for allowing the control lever member to control the output of the driving power source when the locking means locks the rear hand grip,
wherein the first part of the locking means is actuated by the control lever member to lock the rear hand grip relatively to the tool body; and
the control lever member and the first part of the locking means are rotatably supported about a same supporting shaft.

7. The power hand tool as claimed in claim 6, wherein:
the second part of the locking means comprises a plurality of notches;
a protrusive lever is provided to the control lever member;
a lock arm has a space therein for housing the protrusive control lever; and
an end of the lock arm is releasably fitted in one of the notches when pushed by one end of the protrusive lever actuated by the control lever member when the end of the lock arm faces one of the notches.

8. The power hand tool as claimed in claim 7, further comprising a lock lever fitted in another one of the plurality of notches to lock the tool body at one of the rotational positions.

9. The power hand tool as claimed in claim 8, wherein the supporting means supports the rear hand grip rotationally about an axis between the tool body and the rear hand grip, and the lock arm fits in the one of the plurality of notches toward the axis as well as the lock lever fits in another one of the plurality of notches toward the axis.

* * * * *